United States Patent [19]
Richardson

[11] Patent Number: 6,101,568
[45] Date of Patent: Aug. 8, 2000

[54] BUS INTERFACE UNIT HAVING DUAL PURPOSE TRANSACTION BUFFER

[75] Inventor: Nicholas J. Richardson, San Diego, Calif.

[73] Assignee: STMicroelectronics, Inc., Carrollton, Tex.

[21] Appl. No.: 09/139,243

[22] Filed: Aug. 25, 1998

[51] Int. Cl.$^7$ ..................................................... G06F 13/42
[52] U.S. Cl. ............................ 710/129; 710/130; 710/131
[58] Field of Search ................................. 710/100, 101, 710/104, 105, 107, 109, 108, 110, 112, 113, 114, 127, 130, 131, 129

[56] References Cited

U.S. PATENT DOCUMENTS

| | | | |
|---|---|---|---|
| 5,185,869 | 2/1993 | Suzuki | 395/375 |
| 5,526,495 | 6/1996 | Shibata et al. | 395/307 |
| 5,737,566 | 4/1998 | Sparks et al. | 395/427 |
| 5,778,431 | 7/1998 | Rahman et al. | 711/135 |

*Primary Examiner*—Glenn A. Auve
*Assistant Examiner*—Tim Vo
*Attorney, Agent, or Firm*—Stephen C. Bongini; Theodore E. Galanthay; Lisa K. Jorgenson

[57] ABSTRACT

A bus interface unit includes a random-access transaction buffer and at least one pointer queue. The transaction buffer stores entries for both in-order transactions and combinable write transactions, and the pointer queue stores pointers to the buffer entries for in-order transactions so as to order the in-order transactions. When a received combinable write transaction has a writing address that falls within the address range of a stored combinable write transactions, the received transaction is merged with the stored transaction. Additionally, a method is provided for processing requested bus transactions. The bus interface unit determines if a requested transaction is a combinable write transaction. If not, address and data information for the requested transaction is loaded into an empty entry in a random-access buffer, and a pointer to that buffer entry is placed in a pointer queue. Alternatively, if the requested transaction is a combinable write transaction, the bus interface unit determines if the transaction's write address falls within the address range of a stored combinable write transaction. If so, the requested transaction is merged with the stored transaction. In a preferred embodiment, if the write address does not fall within the address range of any stored combinable write transaction, the data information for the requested transaction is loaded into an empty entry in the random-access buffer.

19 Claims, 4 Drawing Sheets

BUS INTERFACE UNIT HAVING DUAL PURPOSE TRANSACTION BUFFER

CROSS-REFERENCE TO RELATED APPLICATIONS

The present application is related to the inventor's applications "BUS INTERFACE UNIT HAVING MULTIPURPOSE TRANSACTION BUFFER" and "COMPUTER SYSTEM HAVING NON-BLOCKING CACHE AND PIPELINED BUS INTERFACE UNIT", which were filed on the same day as the present application. These related applications are herein incorporated by reference.

FIELD OF THE INVENTION

The present invention relates to a bus interface unit for a computer system, and more specifically to a bus interface unit for use in a computer system having an out-of-order processing unit and a non-blocking cache.

BACKGROUND OF THE INVENTION

A typical conventional computer system includes a central processing unit ("CPU"), a cache subsystem, and a bus interface unit ("BIU"). During operation, a read or write request from the CPU is first sent to the cache. If the cache contains the target data (i.e., on a cache hit), the cache directly services the request. Conversely, if the cache does not contain the target data (i.e., on a cache miss) or if the request is directed to an uncacheable memory address or an input/output ("I/O") address, the cache passes the request on to the BIU. When the BIU receives a read or write request, the request is submitted to the external memory or I/O systems using a predefined bus protocol, and any results are returned back to the cache and CPU (via the cache). Additionally, the cache services snoop requests from external agents such as other processors in order to perform cache-coherency operations.

One bus protocol used in modern computer systems is the Pentium® II bus protocol as defined in Volume 1 of the Pentium Pro Family Developer's Manual, which is published by Intel Corporation (Santa Clara, Calif.) and is herein incorporated by reference. In accordance with this protocol, the BIU communicates with the memory and I/O systems using several different read and write request transaction formats including: bus read line ("BRL"), bus read and invalidate line ("BRIL"), bus invalidate line ("BIL"), bus write line ("BWL"), bus read partial ("BRP"), bus write partial ("BWP"), I/O read ("IOR"), and I/O write ("IOW"). A brief description of each of these transactions will now be given.

A bus read line transaction is requested when a new line is to be loaded into the cache. When a CPU read from a cacheable address misses the cache, the cache issues a BRL transaction to the BIU. In response, the BIU makes a read request to main memory for the number of bytes required to fill a cache line (e.g., 32 bytes). Because the CPU can process read transactions speculatively and out-of-order, BRLs do not have any ordering requirements either with respect to each other or with respect to other types of bus transactions.

A bus read and invalidate line transaction is initiated when a CPU write transaction to a cacheable address misses the cache. Like a BRL, a BRIL causes the BIU to read a line from external memory. Additionally, the addressed line is invalidated in all other caches (for external agents in the system) in which the line resides. Although in conventional systems memory writes must generally be kept in order, a BRIL does not directly influence the ordering of the CPU write transaction from which it was generated. Thus, BRILs do not have any ordering requirements either with respect to each other or with respect to other types of bus transactions. Similarly, a bus invalidate line transaction is initiated when a CPU write to a cacheable address hits a shared line in the cache. Such a shared line must be changed to the exclusive state before it can be modified by the CPU. The BIL transaction is used to invalidate the addressed line in all other caches in which the line resides, without reading any data from the external memory. BILs also do not have any ordering requirements either with respect to each other or with respect to other types of bus transactions.

A bus write line transaction is generated when the cache writes a displaced cache line back to memory so that a new line can be loaded into the cache. A BWL is also generated when multiple CPU write transactions to uncacheable memory addresses are accumulated (i.e., write-combined) in the BIU. In a BWL, an entire line (e.g., 32 bytes) is written to the external memory. Like BRLs, BWLs do not have any ordering requirements either with respect to each other or with respect to other types of bus transactions.

The bus read partial and I/O read transactions are generated when the CPU issues a read transaction that is directed to an uncacheable memory address or an I/O address, respectively. When a BRP or an IOR is submitted to the bus by the BIU, one to eight bytes of data are read from the designated address. Similarly, the bus write partial I/O write transactions are generated when the CPU issues a write transaction to an uncacheable memory address or an I/O address. The BWP and IOW transactions cause one to eight bytes of data to be written to the designated address. While the BIU must issue BRPs, BWPs, IORs, and IOWs to the bus in the order in which they are received from the CPU, these types of transactions do not have any ordering requirements with respect to BRLs, BRILs, BILs, and BWLs.

When the BIU receives a read or write request, the transaction is buffered in the BIU. More specifically, the BIU consolidates and orders the received transactions, and then issues the transactions on the bus so as to increase the efficiency (i.e., throughput) of the bus. The bus requests received by the BIU can be divided into two fundamental transaction classes: in-order transactions and speculative write-combine ("SWC") transactions. The BIU stores the in-order transactions (BRLs, BRILs, BILs, BWLs, IORs, IOWs, BRPs, and non-combinable BWPs) in one or more first-in, first-out ("FIFO") queues so that the transactions can be issued to the system bus in the order received. For example, in a typical BIU, a first FIFO queue is used to store cacheable, line-oriented transactions (e.g., BRLs and BWLs), and a second FIFO queue is used to store uncacheable, byte-oriented transactions (e.g., IORs and IOWs).

The SWC transaction requests received by the BIU are stored in a "combining" buffer. In more detail, each SWC request is received by the BIU as a request for writing a relatively small amount of data to memory (e.g., one to eight consecutive bytes for a BWP). If the data bytes to be written by multiple SWC requests fall within the address boundaries of the same data line, the BIU can concatenate the data and issue a single write line request to the system bus. For this purpose, the BIU holds SWC requests in a special combining buffer while awaiting additional SWC requests that can be combined into the held transactions. Each "transaction" stored in a combining buffer is transferred to one of the in-order FIFO queues for issuance to the system bus only after the occurrence of a predefined triggering event (e.g., the combining buffer entry becomes full).

While combining SWC requests increases the efficiency of the bus, the conventional BIU uses completely independent buffers for in-order and SWC transactions. Because each buffer holds all of the address, data, and control information for stored transactions, the combining buffer must be limited to a small number of entries to keep the chip area reasonable. However, when a new SWC request falls outside the address ranges of current entries in a full combining buffer, an incomplete entry must be issued by the BIU to make room for the new request. Thus, the addition of a relatively small buffer that does not significantly increase cost can only produce a limited performance increase. On the other hand, if all incoming write requests are simply placed in an in-order FIFO buffer, each SWC request can only be combined with others that arrive before the original request passes through the FIFO buffer. In this case, an additional buffer is not needed, but the performance increase is limited by the relatively short window of opportunity for write combining multiple requests.

SUMMARY OF THE INVENTION

In view of these drawbacks, it is an object of the present invention to remove the above-mentioned drawbacks and to provide a write-combining bus interface unit that increases the performance of a computer system without increasing cost or complexity. The bus interface unit includes a single random-access transaction buffer for storing the address, data, and control information for all transactions. When an in-order transaction is received, a pointer to the corresponding informational entry in the transaction buffer is placed in an ordering queue. On the other hand, when an SWC request is received, a mode flag is set to indicate that the entry in the transaction buffer is for a combinable write request. Subsequent SWC requests in the same address range are merged with the entry, and a ready flag is used to indicate when the write-combine entry is ready to be issued to the system bus. Because each entry in the dual purpose transaction buffer can be used to store either an in-order or an SWC transaction, a relatively large number of buffer entries can be selectively used to store write-combine entries. Thus, SWC requests for many different address ranges can be handled simultaneously without forcing the issuance of incomplete entries. Further, entry type information and transaction ordering information are stored using a set of flags and pointer queues. This eliminates the need for a separate combining buffer with dedicated transaction entries, so the chip area is reduced. Therefore, the bus interface unit of the present invention can efficiently combine individual write transactions to increase the throughput of the bus without increasing the cost of the system.

It is another object of the present invention to provide a write-combining bus interface unit that makes efficient use of the fields in the transaction buffer. In the dual purpose transaction buffer, the byte-enable flags for a write-combine entry occupy a portion of the field that is used to store the address/control information for an in-order transaction entry. This dual use of the address/control field eliminates the need to add write-combine-specific control bits to each transaction buffer entry, and thus prevents an increase in chip area.

It is yet another object of the present invention to provide a write-combining bus interface unit having control logic that prevents a deadlock situation. The bus interface unit includes a counter that keeps track of the number of write-combine entries present in the transaction buffer. Whenever the counter reaches a predetermined threshold, all write-combine entries in the transaction buffer are marked for immediate issuance to the system bus. In this manner, the bus interface unit prevents the transaction buffer from filling with incomplete write-combine entries so as to not leave any space for new in-order transactions.

According to a first embodiment of the present invention, a bus interface unit is provided that includes a random-access transaction buffer and at least one pointer queue. The transaction buffer stores entries for both in-order transactions and combinable write transactions, and the pointer queue stores pointers to the buffer entries for in-order transactions. The bus interface unit uses the pointers stored in the pointer queue to order the in-order transactions stored in the transaction buffer. Further, when the bus interface unit receives a combinable write transaction whose writing address falls within the address range of one of the combinable write transactions stored in the transaction buffer, the received combinable write transaction is merged with the stored combinable write transaction.

A second embodiment of the present invention provides a method of processing requested bus transactions in a computer system. According to the method, address and data information for both in-order transactions and combinable write transactions is stored as entries in a random-access buffer. Additionally, ordering information for in-order transactions is stored by placing a pointer to each in-order transaction entry in one or more pointer queues. When a received combinable write transaction has a write address that falls within the address range of one of the combinable write transactions stored in the transaction buffer, the received combinable write transaction is merged into the buffer entry for the stored combinable write transaction. In a preferred embodiment, buffer entries for combinable write transactions are marked when ready for issuance to the bus.

A third embodiment of the present invention provides a method of processing requested bus transactions in a computer system. According to this method, the bus interface unit determines if a requested transaction is a combinable write transaction. If the requested transaction is not a combinable write transaction, address and data information for the requested transaction is loaded into an empty entry in a random-access buffer, and a pointer to that buffer entry is placed in a pointer queue. On the other hand, if the requested transaction is a combinable write transaction, the bus interface unit determines if the transaction's write address falls within the address range of a buffer entry that stores a combinable write transaction. If so, the requested combinable write transaction is merged into the buffer entry for the stored combinable write transaction. In one preferred embodiment, if the write address does not fall within the address range of any buffer entry storing a combinable write transaction, the data information for the requested combinable write transaction is loaded into an empty entry in the random-access buffer.

Other objects, features, and advantages of the present invention will become apparent from the following detailed description. It should be understood, however, that the detailed description and specific examples, while indicating preferred embodiments of the invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 5:
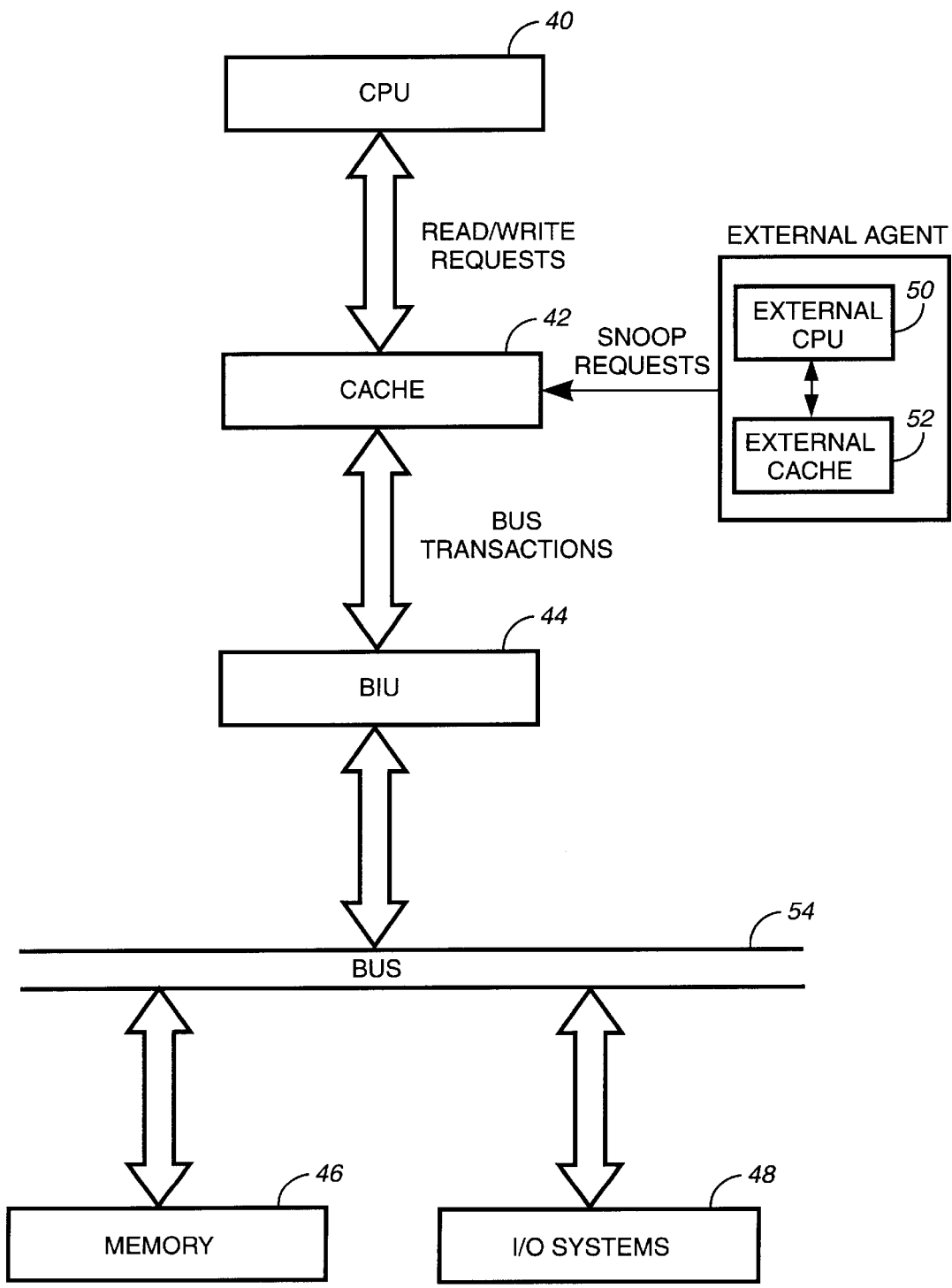
FIG. 5 is a block diagram of essential portions of a computer system that includes a bus interface unit.

In a computer system, a non-blocking cache subsystem 42 is connected between an out-of-order processing unit ("CPU") 40 and a pipelined bus interface unit ("BIU") 44, as shown in FIG. 5. The BIU 44 is also connected to the system bus 54, along with external memory 46 and various I/O systems 48. In some systems, external agents (such as external CPU 50 and its cache 52) are also coupled to the cache 42. In preferred embodiments, the system bus operates in accordance with the Pentium® II bus protocol described above.

Figure 1:
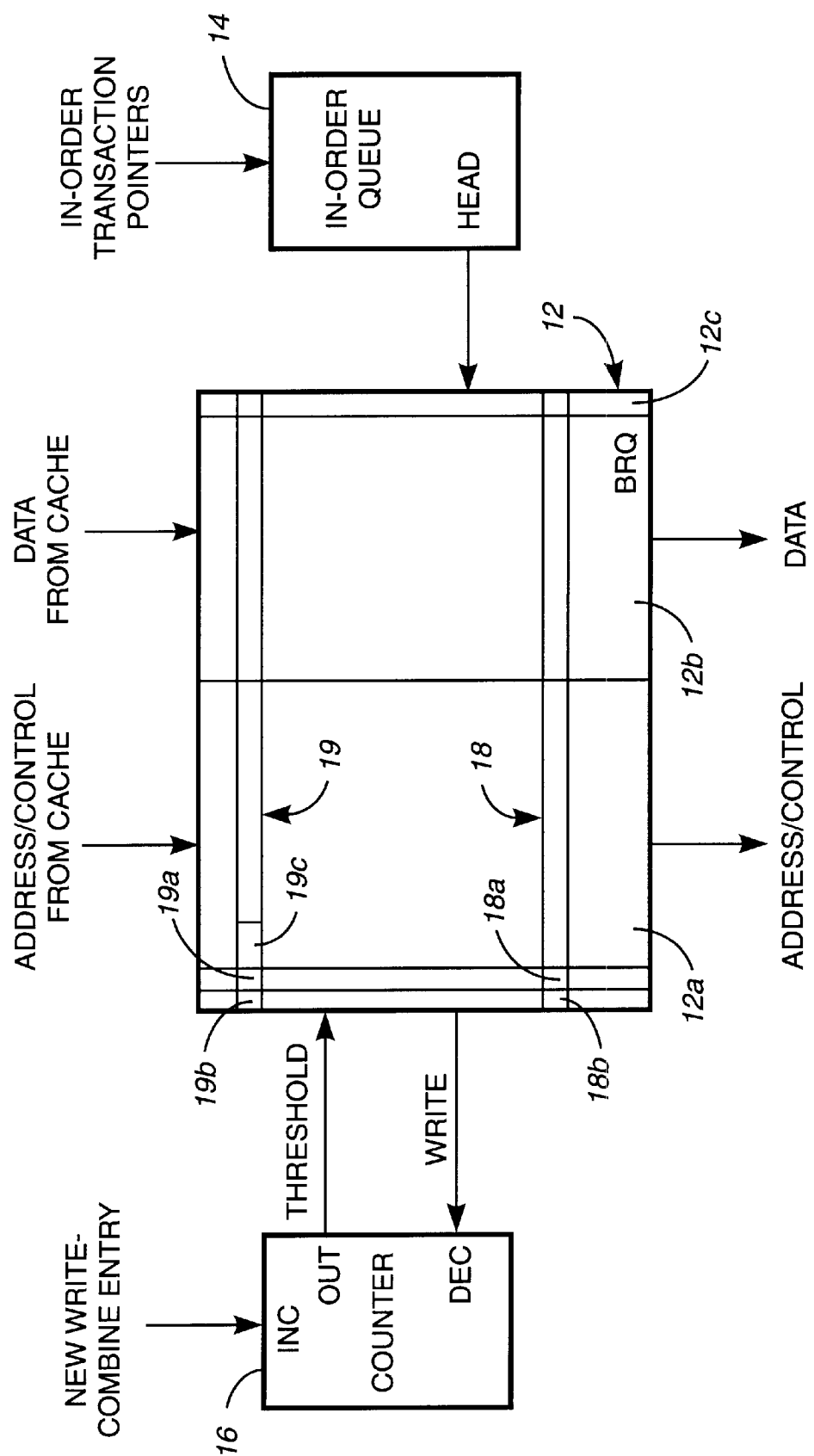
FIG. 1 is a block diagram of a bus interface unit according to an embodiment of the present invention.

FIG. 1 shows a block diagram of the BIU 44 of such a computer system according to an embodiment of the present invention. As shown, a single random-access transaction buffer, which is known as the bus request queue ("BRQ") 12, receives the address, control, and data information for all memory and I/O transactions requested by the cache. Each entry in the BRQ includes a first field 12a for storing the transaction address and other control information, a second field 12b for storing any transaction data (e.g., up to one line, or 32 bytes, of data), and a valid flag 12c for indicating when a transaction is stored in the entry. In addition to the BRQ 12 that stores a collection of randomly-accessible entries, the BIU includes an in-order queue 14 that stores information about the order in which transactions are to be sent to the bus and returned to the cache. Each entry in the queue stores a pointer to one of the informational entries in the random-access BRQ. In further embodiments, multiple queues are provided to separately store ordering information for different types of transactions. The BIU also includes a counter 16 that is coupled to the BRQ 12.

The operation of the BIU of FIG. 1 will now be explained. When an in-order transaction request (i.e., any non-combinable write request) is received from the cache, a new BRQ entry (e.g., 18) is allocated to hold the address, control, and data information for the transaction. Additionally, a pointer to the BRQ entry is placed at the rear of the FIFO in-order queue 14 to allow in-order transactions to be issued to the system bus in the same order as they were received by the BIU. When the BIU is ready to issue an in-order transaction, the pointer at the head of the in-order queue 14 is used to select the BRQ entry corresponding to the next-in-line transaction. After the transaction is issued, the BIU removes the transaction's pointer from the in-order queue.

When a first speculative write-combine ("SWC") request is received from the cache, a new BRQ entry (e.g., 19) is allocated to hold the address, control, and data information for the request. Instead of placing a pointer to the BRQ entry in the in-order queue 14, the BIU sets a mode flag 19a to indicate that the BRQ entry is storing a non-order dependent write-combine request. Furthermore, the BIU increments the value of the counter 16 to register that a write-combine request has been stored, and sets the proper byte-enable flags to indicate which data bytes are to be written. In a preferred embodiment, a portion of the BRQ field 12a used to hold address and control information for in-order transactions is used for the byte-enable flags. That is, if the data field 12b of each BRQ entry holds 32 bytes, then 32 bits in the address/control field 12a of the BRQ entry (e.g., the low-order address bits 19c) are used as byte-enable flags when the entry stores a write-combine request.

Then, when another SWC request is received from the cache, the BIU compares the new request with all write-combine requests currently stored in the BRQ 12. If the address of the new SWC request falls within the address range of a stored write-combine request, the new request is merged into the existing one. More specifically, the data from the new request is merged into the data field 12b of the stored write-combine entry and the appropriate byte-enable flags are set. In such a case, a new BRQ entry is not allocated so the counter is not incremented. If, on the other hand, the address of the new SWC request does not fall within the address range of a stored write-combine request, the request is stored in a new BRQ entry in the manner described above.

The BIU holds each write-combine request in the BRQ until release is triggered by the occurrence of a special event. For example, release of a write-combine request may be triggered when the request's data field becomes full, when the counter value reaches a predetermined threshold, when a memory read request overlaps the address range of the write-combine request, or when the BIU receives a synchronizing transaction (i.e., a transaction such as an IOW or IOR that requires the completion of all prior external memory transactions). When such an event triggers the release of a write-combine request, a "ready" flag 19b is set in the request's BRQ entry to indicate that the transaction is ready to be issued to the system bus. In preferred embodiments, new SWC requests are prevented from merging with a write-combine request that has been marked as ready in order to insure that the data to be written does not change during the bus transaction.

Figure 2:
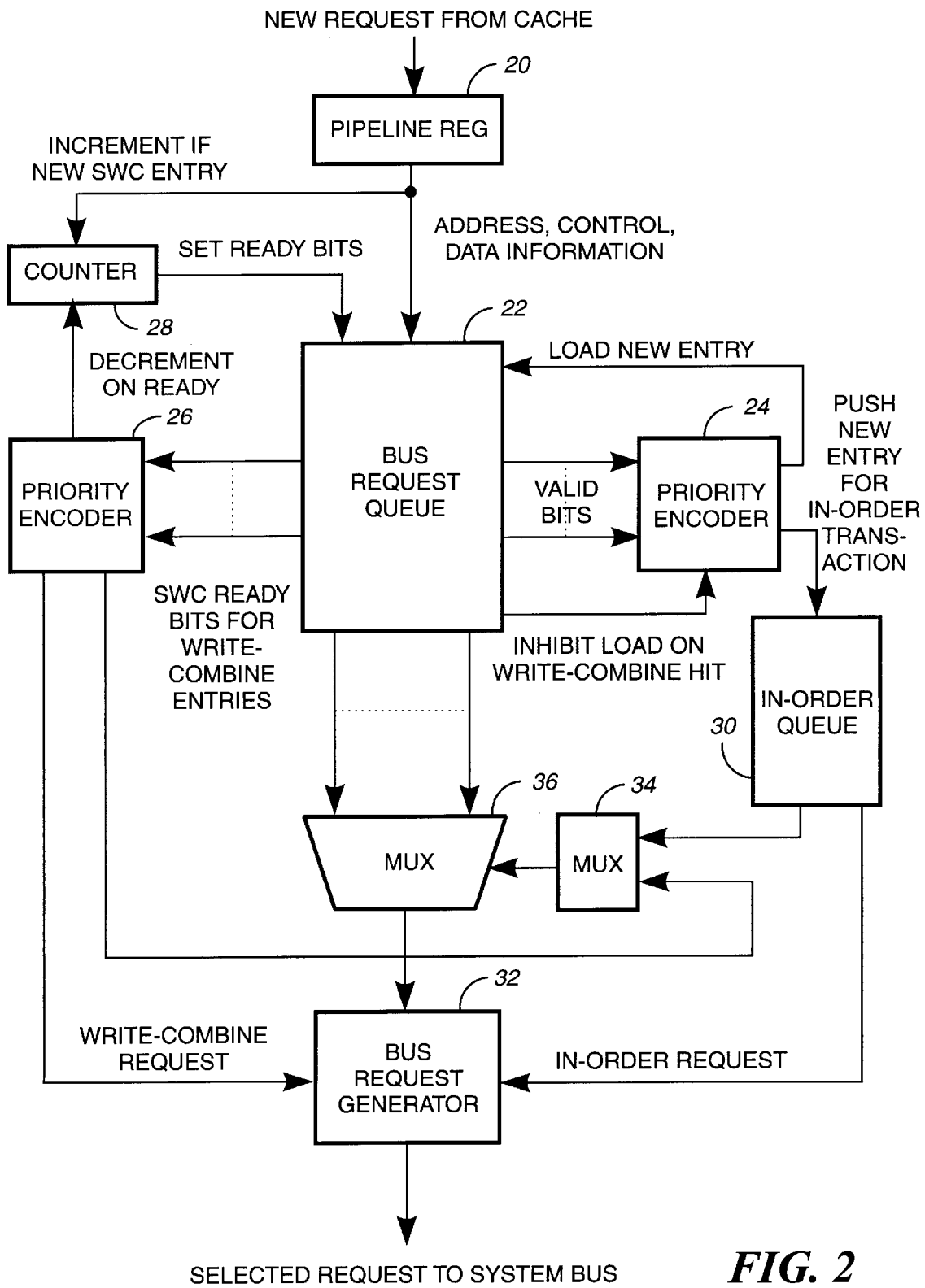
FIG. 2 is a block diagram of a preferred embodiment of the bus interface unit of FIG. 1.

FIG. 2 shows in detail a BIU according to a preferred embodiment of the present invention. As shown, random-access BRQ 22 receives the address, control, and data information for all incoming transactions from a pipeline register 20. The BRQ 22 of FIG. 2 is identical to the BRQ 12 described above for FIG. 1, so a further description thereof is omitted. Additionally, a first priority encoder 24 is used to select an empty BRQ entry when storing a new transaction, and a second priority encoder 26 is used to select a write-combine BRQ entry for issuance to the system bus. A FIFO in-order queue 30 stores pointers to in-order BRQ entries to indicate the order in which these transactions are to be issued. When a BRQ entry is ready to be issued, the entry is selected by either the in-order queue 30 or second priority encoder 26 (via first multiplexer 34 and second multiplexer 36), and a transaction request is sent to a bus request generator ("BRG") 32. The BIU also includes a counter 16 that keeps track of the number of write-combine entries in the BRQ.

Figure 3:
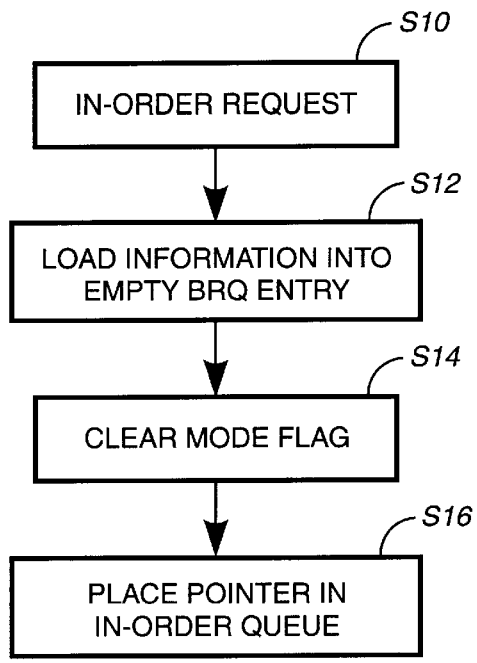
FIG. 3 is a flow chart of the process used to store an in-order transaction in the bus interface unit of FIG. 2.
Figure 4:
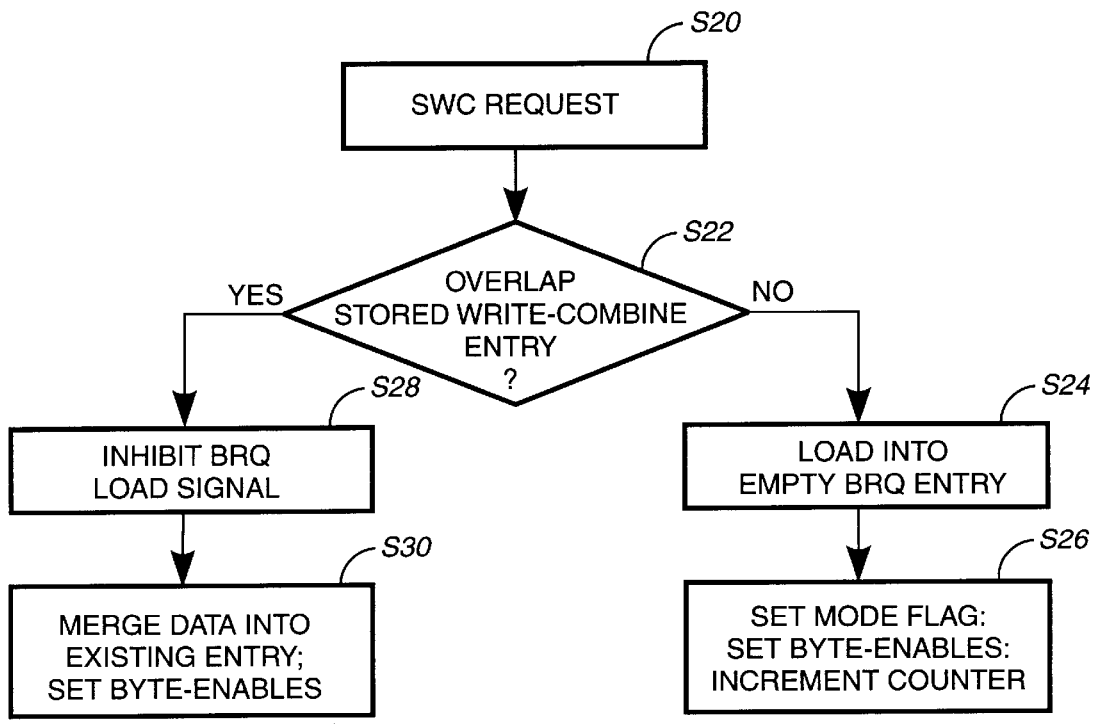
FIG. 4 is a flow chart of the process used to store an SWC transaction in the bus interface unit of FIG. 2.

The operation of the BIU of the preferred embodiment will now be explained with reference to the flowcharts of FIGS. 3 and 4. When the cache 42 sends a new in-order transaction request (S10), the first priority encoder 24 selects a BRQ entry that has a cleared valid flag and asserts the load signal for that entry to load the transaction's address, control, and data information (S 12). The mode flag for the selected entry is cleared to indicate that the entry is storing an in-order transaction (S 14). Additionally, a pointer to the BRQ entry used to store the new transaction is placed at the rear of the FIFO in-order queue (S 16).

Whenever the in-order queue 30 is not empty, it sends a transaction request to the BRG 32. When the BRG is ready to service the in-order request, the pointer at the head of the in-order queue is used to select the next-in-line transaction's BRQ entry (via the multiplexers 34 and 36). The BRG 32 issues the transaction to the system bus using the information stored in the BRQ 22, and then the pointer is removed from the in-order queue 30. When the transaction is completed, the BIU clears the valid flag for the transaction's BRQ entry so that the entry can be used for another transaction.

When the cache 42 sends a new SWC transaction request (S20), the BIU compares the address of the new request with all write-combine requests currently stored in the BRQ (S22). If the address of the new SWC request does not fall within the address range of a stored write-combine request, the first priority encoder 24 allocates an empty BRQ entry for the SWC request in the manner described above (S24). Additionally, the mode flag for the selected BRQ entry is set and the counter value is incremented because the entry is storing a write-combine request (S26). While the received SWC request contains less than a full line of data (e.g., 1 to 8 bytes), the write-combine entry is stored with a data size of one line (e.g., 32 byte) and with its address aligned on a line address boundary. Therefore, the BIU must set byte-enable flags to indicate the valid data bytes in the entry (S26). (The byte-enable flags occupy a portion of the entry that would be used to hold control information for an in-order transaction, as described above.)

On the other hand, if the address of the new SWC request falls within the address range of a stored write-combine request, then the load signal of the first priority encoder 24 is inhibited to prevent the allocation of a BRQ entry to the incoming request (S28). Additionally, the data from the new request is written into the data portion of the stored write-combine request and the corresponding byte-enable flags are set (S30).

When a triggering event requires that a write-combine entry be written to memory, the ready flag for the entry is set. In particular, the ready flag for one write-combine entry is set if a read request overlaps the address range of the entry, or if mergers cause all of the byte-enable flags for the entry to be set (i.e., if the entry becomes full). Further, the ready flags for all write-combine entries in the BRQ are simultaneously set if the counter value reaches a predetermined threshold, or if an I/O or special synchronizing request is received. Once a write-combine entry's ready flag is set, other SWC requests are prevented from merging with that entry so that the data to be written does not change while the BRG is issuing the transaction. Additionally, the counter value is decremented whenever a single ready flag is set and is reset to zero whenever all ready flags are set. This allows the counter to accurately keep track of the number of "waiting" write-combine entries (i.e., those that have not already been marked for issuance to the system bus).

The second priority encoder 26 OR's together the ready flags for all write-combine entries so that whenever one or more ready flags are set, a transaction request is sent to the BRG 32. When the BRG is ready to service the write-combine request, the second priority encoder 26 selects one of the write-combine entries (via the multiplexers 34 and 36) based on the set ready flags and a priority scheme. The BRG examines the byte-enable flags for the selected write-combine entry. If all byte-enable flags are set, the BRG issues a BWL and all of the entry's data is written to memory in one transaction. Alternatively, if all byte-enable flags are not set, the BRG issues one or more BWPs to the system bus so as to write only the entry's valid data bytes to memory. When all bus transactions spawned by the write-combine entry are completed, the BIU clears the valid flag for the entry so that it can be used for another transaction.

As previously explained, the present invention provides a bus interface unit that increases performance through the efficient handling of combinable write requests. A single random-access transaction buffer is used to store the necessary information for all bus transactions requested by the CPU or cache. An ordering queue stores pointers to entries in the transaction buffer that store in-order transaction requests, and a mode flag is set for entries that store combinable write requests. Because of this single buffer/pointer ordering queue/mode flag structure, any buffer entry can be used for storing a write-combine request and the total number of entries available for write-combine requests is dynamic. This increases the number of separate write-combine entries that can simultaneously exist so as to create a greater opportunity for the combining of write requests. At the same time, the need for a dedicated combining buffer is eliminated. Thus, the BIU of the present invention efficiently adapts to the mix of transactions that are presented during program execution.

Further, in preferred embodiments, the BIU includes a counter that keeps track of the total number of write-combine entries in the transaction buffer. This allows the BIU to prevent deadlock by monitoring and limiting the number of incomplete write-combine entries stored in the transaction buffer. Additionally, some embodiments of the present invention make dual use of a portion of the transaction buffer. One portion of the transaction buffer is used to hold address and control information for in-order transaction entries and the byte-enable flags for write-combine entries. This dual use eliminates the need for dedicated byte-enable flags, and thus prevents an increase in chip area.

The embodiments of the present invention described above relate to a computer system having Pentium®-type processors and a system bus that operates in accordance with the Pentium® II bus protocol. However, the bus interface unit of the present invention could be implemented in a system that utilizes a different type of processor and/or a different bus protocol. Similarly, while the above embodiments are described in relation to a multiple processor computer system, single or multiple processor computer system having varying features and abilities could be implemented with the bus interface unit of the present invention. Further, some embodiments of the present invention may not include dedicated circuitry for requesting issuance of write-combine requests. (For example, in one embodiment, a pointer to a write-combine entry is placed in the in-order queue when the entry is "ready" to be issued.)

Additionally, other design choices, such as the computer system's architecture, the number of in-order queues and the use of each, the number of entries in the transaction buffer and each in-order queue, the format of the transaction buffer entries and flags, and the transaction selection and deadlock prevention mechanisms could easily be adapted by one of ordinary skill in the art. Furthermore, embodiments of the present invention may not include all of the features described above. For example, the dual purpose address/control field, the write-combine entry counter, and the cache subsystem may not be included in all embodiments.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A bus interface unit for interfacing with a bus of a computer system, the bus interface unit having at least one input for receiving in-order transactions and combinable write transactions, said bus interface unit comprising:
   a random-access transaction buffer that stores informational entries for both in-order transactions and combinable write transactions, each of the informational entries including address information, data information, and mode information; and
   at least one pointer queue coupled to the transaction buffer, the pointer queue storing pointers to informational entries for received in-order transactions,
   wherein the pointers stored in the pointer queue are used to order the in-order transactions stored in the transaction buffer, and
   when the bus interface unit receives a combinable write transaction whose writing address falls within the address range of one of the combinable write transactions stored in the transaction buffer, the received combinable write transaction is merged with the stored combinable write transaction so as to store the received combinable write transaction and the stored combinable write transaction in a single informational entry.

2. The bus interface unit as defined in claim 1, further comprising a counter coupled to the transaction buffer, the counter keeping track of the number of entries for combinable write transactions in the transaction buffer.

3. The bus interface unit as defined in claim 1, wherein byte-enable flags in an entry for a combinable write transaction occupy a portion of the entry that is used for address and control information when storing an in-order transaction.

4. A computer system including the bus interface unit as defined in claim 1, said computer system further including:
   a processing unit;
   a cache subsystem coupled to the processing unit and the bus interface unit; and
   external memory coupled to the bus interface unit through the bus,
   wherein the cache subsystem sends in-order transactions and combinable write transactions to the bus interface unit, and
   the bus interface unit selectively issues transactions to the bus in order to access the contents of the external memory.

5. The bus interface unit as defined in claim 2, wherein when the counter reaches a predetermined threshold, all of the entries for combinable write transactions are marked as ready for issuance to the bus.

6. The computer system as defined in claim 4, further comprising an external agent including at least an external processing unit, the external agent being coupled to the cache subsystem.

7. A method of processing requested bus transactions in a computer system having a bus, each transaction including address and data information, said method comprising the steps of:
   storing the address and data information for both in-order transactions and combinable write transactions as entries in a random-access buffer;
   storing ordering information for in-order transactions by placing a pointer to each in-order transaction entry in one or more pointer queues; and
   when a received combinable write transaction has a write address that falls within the address range of one of the combinable write transactions stored in the transaction buffer, merging the received combinable write transaction into the buffer entry for the stored combinable write transaction so as to store the received combinable write transaction and the stored combinable write transaction in a single buffer entry.

8. The method as defined in claim 7, further comprising the steps of:
   selectively marking buffer entries for combinable write transactions as ready for issuance to the bus; and
   issuing a combinable write transaction to the bus only after the buffer entry for the transaction has been marked as ready for issuance.

9. The method as defined in claim 7, wherein the step of storing the address and data information includes the sub-steps of:
   storing address and control information in a portion of the buffer entry when storing an in-order transaction; and
   storing at least byte-enable flags in the same portion of the buffer entry when storing a combinable write transaction.

10. The method as defined in claim 7, further comprising the step of placing a pointer to a buffer entry for a combinable write transaction in one of the pointer queues when the transaction is ready to be issued to the bus.

11. The method as defined in claim 8, further comprising the step of marking at least one buffer entry for a combinable write transaction as ready for issuance when the number of buffer entries storing combinable write transactions exceeds a predetermined threshold.

12. The method as defined in claim 8, wherein the step of selectively marking buffer entries includes the sub-steps of:
   marking a buffer entry as ready for issuance when a read request overlaps the address range of the buffer entry;
   marking a buffer entry as ready for issuance when a merger causes all byte-enable flags for the entry to be set;
   marking all buffer entries storing combinable write transactions as ready for issuance when the number of buffer entries storing combinable write transactions exceeds a predetermined threshold; and
   marking all buffer entries storing combinable write transactions as ready for issuance when an I/O or synchronizing transaction is received.

13. A method of processing requested bus transactions in a computer system, each transaction including address and data information, said method comprising the steps of:
   determining if a requested transaction is a combinable write transaction;
   if the requested transaction is determined not to be a combinable write transaction, performing a first transaction storing process that includes the steps of:
      loading the address and data information for the requested transaction into an empty entry in a random-access buffer; and
      placing a pointer to the buffer entry that is used in a pointer queue; and if the requested transaction is determined to be a combinable write transaction, performing a second transaction storing process that includes the steps of:
   determining if the requested combinable write transaction has a write address that falls within the address range of a buffer entry that stores a combinable write transaction; and
   if the write address falls within such address range, merging the requested combinable write transaction into the buffer entry for the stored combinable write transaction so as to store the requested combinable write transaction and the stored combinable write transaction in a single buffer entry.

14. The method as defined in claim 13,
   wherein the first transaction storing process further includes the step of marking the buffer entry that is used as not storing a combinable write transaction; and
   the second transaction storing process further includes the step of loading the data information for the requested combinable write transaction into an empty entry in the random-access buffer and marking the buffer entry that is used as storing a combinable write transaction, if the write address does not fall within the address range of any buffer entry storing a combinable write transaction.

15. The method as defined in claim 13, further comprising the steps of:
   selectively marking buffer entries for combinable write transactions as ready for issuance to the bus; and
   issuing a combinable write transaction to the bus only after the buffer entry for the transaction has been marked as ready for issuance.

16. The method as defined in claim 13, further comprising the step of placing a pointer to a buffer entry for a combinable write transaction in the pointer queue when the transaction is ready to be issued to the bus.

17. The method as defined in claim 14, wherein the second transaction storing process further includes the step of setting byte-enable flags in accordance with the address and data information for the requested combinable write transaction.

18. The method as defined in claim 15, further comprising the step of marking at least one buffer entry for a combinable write transaction as ready for issuance when the number of buffer entries storing combinable write transactions exceeds a predetermined threshold.

19. The method as defined in claim 17, wherein the byte-enable flags occupy a portion of the buffer entry that is used for address and control information when the entry does not store a combinable write transaction.

* * * * *